M. F. KUNTZ.
COMBINATION LOCK.
APPLICATION FILED MAR. 29, 1920.

1,377,697.

Patented May 10, 1921.
2 SHEETS—SHEET 1.

INVENTOR,
Matthias F. Kuntz,
BY Howard S. Smith
His ATTORNEY.

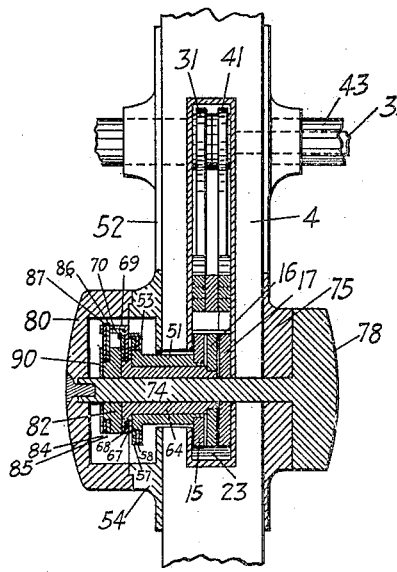
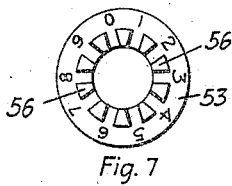
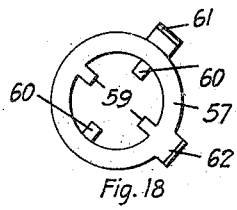
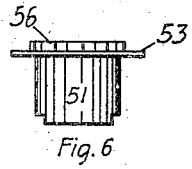
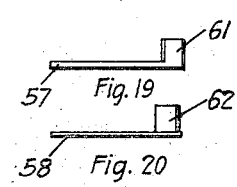
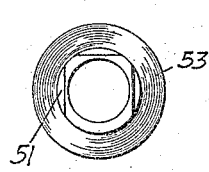
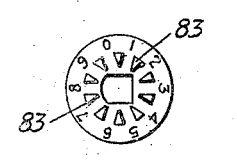
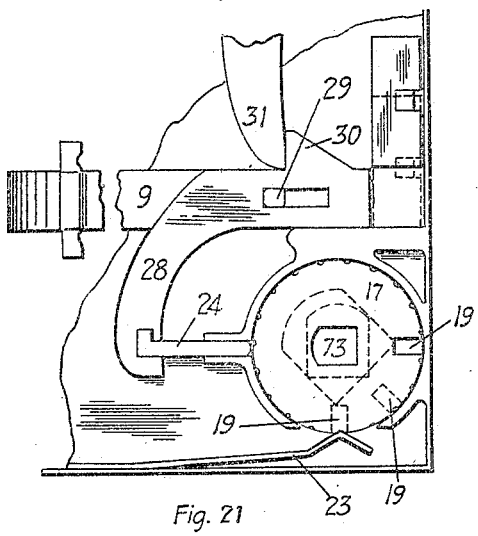
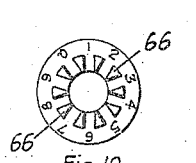
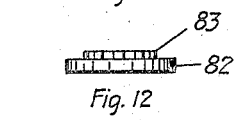
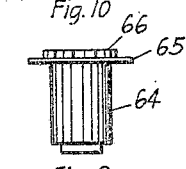
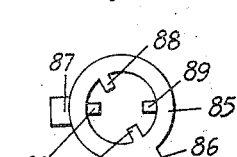
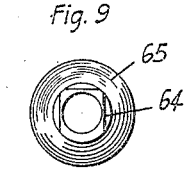
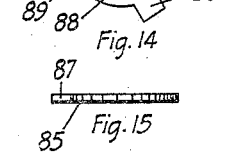
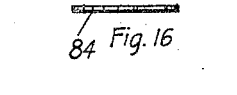
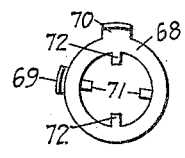

UNITED STATES PATENT OFFICE.

MATTHIAS F. KUNTZ, OF DAYTON, OHIO.

COMBINATION-LOCK.

1,377,697.  Specification of Letters Patent.  Patented May 10, 1921.

Application filed March 29, 1920. Serial No. 369,647.

*To all whom it may concern:*

Be it known that I, MATTHIAS F. KUNTZ, a citizen of the United States, residing in the city of Dayton, in the county of Montgomery and State of Ohio, have invented certain new and useful Improvements in Combination-Locks, of which the following is a specification.

One of the principal objects of my invention is to provide a combination, keyless lock on which there are no numbers to be brought into registry, in which there are no ticks to be heard, and which is operated through the feeling quality of the fingers.

It is another object of my invention to provide a keyless lock in which over fifteen hundred different combinations can be easily set by following the directions given in a book to accompany the lock.

Another object of my invention is the provision of a double knob on the inside of the lock, by which the door may be opened in the event of fire or other emergency independent of the outside knob.

My improved combination lock is particularly adapted for use on automobiles, desks, cash registers and kindred devices which employ a lock of any kind.

Other important and incidental objects will be brought out in the following specification and particularly set forth in the subjoined claims.

Figure 1:
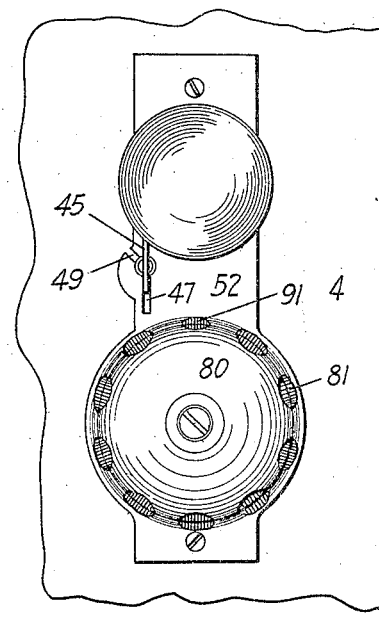
Figure 2:
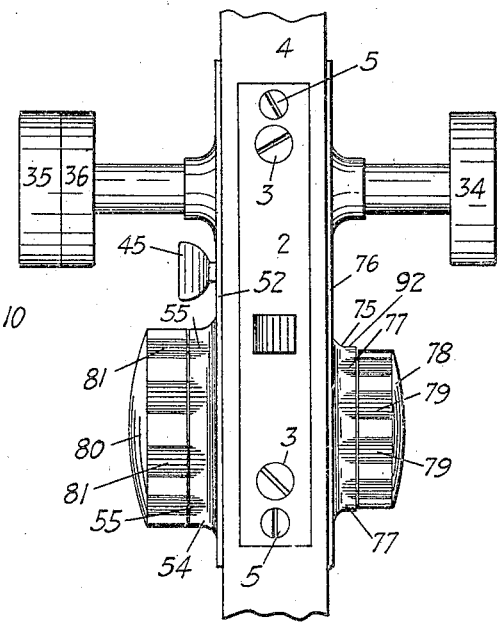
Figure 3:
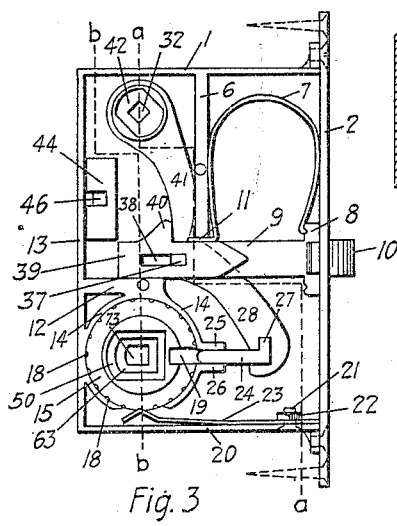
Figure 4:
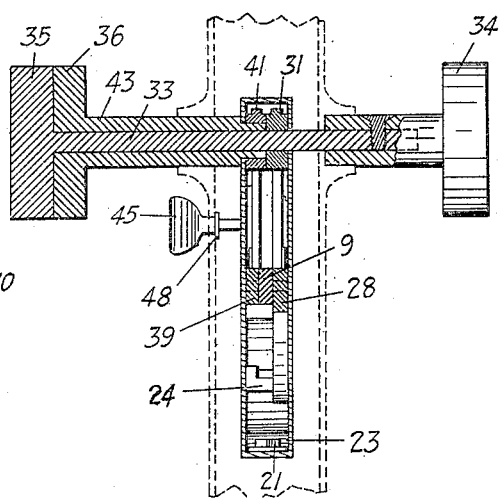

The preferred form of embodiment of my invention is illustrated in the accompanying drawings, of which Figure 1 is an inside view of my combination lock. Fig. 2 is an end view thereof. Fig. 3 is a plan view of the locking mechanism within the casing, with the cover plate of the latter removed. Fig. 4 is a cross sectional view taken through my combination lock, on the line *a—a* of Fig. 3. Fig. 5 is a cross sectional view taken through said combination lock on the line *b—b* of Fig. 3. Fig. 6 is a side view of the outermost sleeve in Fig. 5. Fig. 7 is a top plan view of the latter, showing the combination numerals and sector shaped teeth upon the top portion of said sleeve. Fig. 8 is a bottom plan view of said sleeve. Fig. 9 is a side view of the sleeve that telescopes into the sleeve shown in Fig. 6. Fig. 10 is a top plan view of the second sleeve. Fig. 11 is a bottom plan view of the latter. Fig. 12 is a side view of the collar that is adapted to be rotated by the combination knob spindle to turn the first and second sleeves. Fig. 13 is a top plan view of said collar. Fig. 14 is a plan view of the two superimposed rings and their lateral projections, which are fitted upon the said collar. Fig. 15 is a side view of one of said rings and Fig. 16 a side view of the other ring. Fig. 17 is a plan view of the superimposed rings that are adapted to be fitted upon the top of the second sleeve. Fig. 18 is a plan view of the superimposed rings that are adapted to be fitted upon the top of the first or outermost sleeve. Fig. 19 is a side view of one of said rings, showing its upturned projection. Fig. 20 is a side view of the other ring showing its upturned projection, and Fig. 21 is a bottom plan view of the locking mechanism, showing the slot in the link member that receives the lug on the inwardly an outwardly movable locking element.

Throughout the specification and drawings, similar reference characters denote corresponding parts.

Referring to the accompanying drawings, the numeral 1 designates a lock casing preferably rectangular in cross section and to which an end plate 2 is secured by screws 3. The casing 1 is adapted to be inserted in a recess within a door 4 or other member to which it is firmly secured by screws 5.

Extending from one end wall of the casing 1, to the middle portion of the latter, is a central partition 6 between which and the end plate 2 a U-shaped spring 7 is positioned. The front end of this spring in Fig. 3 bears against a lug 8 projecting laterally from a locking or latching element 9 slidable within the casing 1 to project its front beveled end 10 through a hole in the end plate 2. The spring 7 has an approximately right-angled extension 11 which is fitted between the movable locking element 9 and the inside end of the stationary partition 6. This extension 11 acts as a guide for the locking element 9, in conjunction with a short partition 12 that projects inwardly from, and at right angles to, the end wall 13 of the casing 1. (See Fig. 3.)

Projecting from the inner end of the patition 12 is a semi-circular flange 14 which acts as a guide for three superimposed locking disks 15, 16 and 17, each of which contains a plurality of small notches 18, and a large recess 19, in its periphery. Firmly secured to the wall 20 of the casing 1 near the end plate 2, is one end of an elongated pawl member 23 made of spring material to press its outer dented end into any one of the notches in the disks 15, 16 and 17 to restrain their rotation until that movement is effected by means to be hereinafter described.

The disks 15, 16 and 17 are provided to prevent the inward movement of the locking member 9, except when they are rotated by the combination means to be described for the purpose of bringing the recesses 19 into alinement to receive the front end of a movable pin 24. The front end of this pin is guided into the alined recesses by a guide 25 which is an extension of the flange 14, and a guiding flange 26 that terminates in a circular portion which assists in holding the disks in their proper positions within the casing 1. (See Figs. 3 and 4.)

The pin 24 terminates at its outer end in a right angled portion 27 which fits in a slot provided in the outer end of a flat link member 28 which curves inwardly to bring its straight rear end underneath the rear end of the locking element 9, and containing in that end a slot in which a downwardly projecting lug 29 on the rear end of said locking element is longitudinally movable for a purpose to be hereinafter described. (See Fig. 21.)

Projecting laterally from the rear end of the link member 28 is a lug 30 adapted to be engaged by the tapering front end of a dog 31 in whose enlarged rear end there is a square cut hole 32 to receive a spindle 33 that loosely passes through the casing 1 and door 4 to receive on one end a firmly attached knob 34, and on its other, or inside end, a firmly secured knob 35. When the recesses 19 in the disks 15, 16 and 17 are in alinement, and the knob 34 or 35 is turned, the dog 31 will engage the lug 30 on the link member 28 to force it inwardly, and with it, the locking member 9 by reason of the engagement of the lug 29 on the latter with the forward end of the slot in said link member 28. During this operation the spring 7 is compressed to force the locking element 9 outwardly into locking position when the knob is turned in the opposite direction. Now when element 9 is in its locking position, the knobs 34 and 35 cannot be turned to move it inwardly after the disks have been rotated to bring their recesses 19 out of alinement, for then the pin 24, being restrained from inward movement by reason of the engagement of its front end with the peripheries of the disks, will prevent the inward movement of the link member 28 to which the locking element 9 is connected through the lug and slot just described. However, the locking element 9, in case of fire or other emergency, may be moved inwardly independent of the link member 28, by an inside knob 36, through means now to be described.

Referring to Figs. 3, 4 and 5, a lug 37 projects outwardly from the rear portion of the locking element 9, into an elongated slot 38 provided in a flat piece 39 movable over the outer portion of the locking element 9. Projecting laterally from this piece 39 is a lug 40 adapted to be engaged by the front tapering end of a dog 41 containing in its enlarged end an approximately oblong hole 42 through which projects a sleeve 43 of similar shape in cross section. This sleeve surrounds the inner end of the spindle 33, and to its outer end there is firmly secured the inside knob 36 which turns freely about the spindle 33 independent of the knob 35. Accordingly, when the inside knob 36 is turned, the dog 41 will engage the lug 40 on the movable piece 39, to force it rearwardly. By it the locking element 9 will be moved inwardly independent of the link member 28, for the projection 29 on said locking element is free to move rearwardly through the slot in the link member. On the other hand, when the locking element 9 is moved rearwardly by the link member 28, such movement will not be restrained by the inside knob 36 since the slot 38 in the movable piece 39 will permit a free inward movement of the lug 37 on said locking element.

The inward movement of the link member 28, locking element 9 and movable piece 39 may all be restrained, however, by a block 44 which is moved between the ends of the link member, locking element and movable piece, and the wall 13 of the casing 1, by a key 45 whose inner end fits in a recess 46 in said block. The shank of this key is movable through a vertical slot 47 in the casing wall, being held in said slot by a bead 48. When the block 44 is moved upwardly into locking position, the shank portion of the key 45 may be moved into an upwardly inclined portion 49 of the slot 47 to hold said block in its locking position. (See Fig. 1.)

For the purpose of bringing the recesses 19 in the disks 15, 16 and 17 into alinement only upon the reaching of a certain combination, the following means are provided. Referring to Figs. 3, 5, and 21, the disk 15, which is the top or outermost disk in Fig. 3, is provided with a central hole 50 of oblong shape, with one rounded end. Into this hole is fitted a sleeve 51 (see Fig. 6) whose lower end is formed to the shape of the hole and whose outer end projects through an inside finger plate 52 to bring its top flanged portion 53 into an annular housing 54 in whose outer periphery are formed fingertip recesses 55 for a purpose to be hereinafter described.

Struck upwardly from the flanged top portion 53 of the sleeve 51, around its central opening, is a series of sector-shaped teeth 56 opposite the space btween each two of which on the outer rim of the flanged top 53, there is left room for a number. These numbers begin with "1" and end with "9," with a "0" mark between the first and last numbers. Adapted to be fitted on the flanged top 53 of this sleeve 51, are two rings 57 and 58, the latter being preferably of less thickness than the former and is applied first. The central hole in each ring is large enough for the teeth 56 on the sleeve 51 to project through, the lower ring 58 having two radial projections 59, 59 which fit between the teeth to hold said ring on the sleeve. The ring 57 is then slipped over the teeth, said ring having radial projections 60, 60 which fit between said teeth to hold it against the ring 58 on the sleeve. Preferably integral with its outer rim, the ring 57 has a lateral projection which terminates in an upturned right-angled lug 61, while the ring 58 has a similar lug 62, for a purpose to be hereinafter described. These lugs are in a position to be engaged by rotating means to turn their respective rings, and through them the sleeve 51 and the disk 15 into which it is fitted. (See Figs. 18, 19 and 20.)

The means provided for engaging the lugs 61 and 62 to turn the disk 15 will now be described. The disk 16 contains a central hole 63 of the same shape as, but smaller than, the hole 50 in the disk 15. Into the hole 63 is fitted a sleeve 64 (see Fig. 9) whose lower end is formed to the shape of the hole and whose upper end terminates in a flanged portion 65 which rests upon, or bears against, the ring 58.

Referring to Fig. 10, there is formed upon the flanged top portion 65 of the sleeve 64, around its middle hole, a series of sector-shaped teeth 66 opposite the space between each two of which on the outer rim of the flanged top 65 there is left room for a number. These numbers begin with "1" and end with "9," with a "0" mark between the first and last numbers. Adapted to be fitted on the flanged top 65 of the sleeve 64 are two rings 67 and 68 similar to, though smaller than, the rings 57 and 58, and like the latter rings, having upturned lugs 69 and 70 respectively. (See Figs. 5 and 17.) The rings 67 and 68 also have similar radial projections 71, 71 and 72, 72 which fit between the teeth 66 to securely hold said rings on the sleeve 64. Each of the lugs 61 and 62 is in the path of rotary movement of the lugs 69 and 70, to be engaged by them to turn the sleeve 51 when the sleeve 64 has been turned a designated distance in either direction by means now to be described.

Referring to Figs. 3, 5 and 21, the disk 17 contains a central hole 73 similar in shape to, but smaller than, the hole 63 in the disk 16. Projecting through the hole 73 in the disk 17, and loosely through the holes in the other disks and their respective sleeves, is a spindle 74 of the same shape in cross section as the hole 73. In one direction this spindle projects through an annular housing 75 formed on an outside plate 76 secured to the door 4, said housing containing in its outer periphery finger-tip recesses 77 similar to the recesses 55 in the housing 54. Firmly secured on the outer end of the spindle 74 is an annular knob 78 in whose periphery are formed finger-tip recesses 79 adapted to be brought into complete or partial registry with the recesses 77 in the housing 75 for a purpose to be hereinafter described. Firmly secured to the other end of the spindle 74 beyond the annular housing 54, is an annular knob 80 in whose periphery are formed finger-tip recesses 81 also for a purpose to be hereinafter described. (See Figs. 1, and 5.)

Adapted to be slipped over the inner end of the spindle 74, after the latter has been passed through the disks and the sleeves and the outermost ring 68, is a collar 82 (see Fig. 12) whose central hole is formed to the shape of the spindle whereby it may be rotated by the latter. Referring to Fig. 13, there is formed upon the top surface of the collar 82, around its middle hole, a series of sector-shaped teeth 83 opposite the space between each two of which on the outer top rim of said collar there is left room for a number. These numbers begin with "1" and end with "9," with a "0" mark between the first and last numbers.

Adapted to be fitted on the top of the collar 82 are two rings 84 and 85, the ring 84 having a laterally projecting lug 86 and the ring 85 a laterally projecting lug 87. (See Figs. 14, 15 and 16.) The central hole in each ring is large enough to receive the teeth 83 on the collar 82, the ring 84, which is first applied to said collar, having radial projection 88, 88 which fit between said teeth to hold the ring on the collar. The ring 85 is then slipped over the teeth 83, said ring having radial projections 89, 89 which fit between said teeth to hold it against the ring 84 on the collar 82. Between the outermost ring 85 and the knob 80, a washer 90 is preferably placed. (See Fig. 5.)

The lugs 86 and 87 on the rings 84 and 85 project outwardly sufficiently far to engage the upturned lugs 69 and 70 on the rings 67 and 68 when the spindle 74 is turned, to rotate, through the latter, the sleeve 64 fitted in the disk 16, and through the rings 57 and 58, the sleeve 51 that is fitted into the disk 15. It is thus possible by turning the knob 78 or the knob 80 a sufficient number of times in each direction, a distance each time that is determined upon in advance, to independently turn the disks 15, 16 and 17 to positions wherein their recesses 19 will come into proper alinement to receive the pin 24.

My improved lock makes possible over fifteen hundred combinations any one of which may be set as follows: The ring 58 is first applied to the top portion of the sleeve 51 to bring the lug 62 opposite a certain number, after which the radial projections 59, 59 are inserted between those teeth of the group of teeth 56 that will hold said ring securely in its set position. The ring 57 is then applied to the top portion of said sleeve to bring its lug 61 opposite the same or another number, whereupon the radial projections 60, 60 are inserted between those teeth of the group 56 that will hold the latter ring firmly in its set position.

The sleeve 64 is then projected through the sleeve 51, to fit its bottom end within the central hole 63 of the disk 16. The ring 67 is then applied to the top portion of the sleeve 64 to bring the lug 69 opposite a certain number thereon, after which the radial projections 71, 71 are inserted between those teeth of the group of teeth 66 that will hold said ring securely in its set position. The ring 68 is then applied to the top portion of the sleeve to bring its lug 70 opposite the same or another number, whereupon the radial projections 72, 72 are inserted between those teeth of the group 66 that will hold the latter ring firmly in its set position.

The collar 82 is then slipped over the spindle 74 to rest against the ring 68, after which the ring 84 is applied to the top portion of the collar to bring the lug 86 opposite a certain number thereon, whereupon the projections 88, 88 are fitted between those teeth of the group of teeth 83 that will hold said ring securely in its set position. The ring 85 is then applied to the top portion of the sleeve to bring its lug 87 opposite the same or another number after which the radial projections 89, 89 are inserted between those teeth of the group of teeth 83 that will hold the latter ring firmly in its set position.

The washer 90 is then slipped over the inner end of the spindle 74 and the inner knob 80 applied to the latter. The knob 80 is now ready to be turned a certain number of notches in each direction from the initial or smallest recess 91, in accordance with the numbers placed in a record book opposite the combination that has been set by bringing each lug on the several rings to a position opposite the number designated for that lug in the combination record. The starting or smallest finger-tip recess 91 for the knob 80 is provided in the periphery of the annular housing 54, and can be accurately arrived at through the feeling quality of the fingers. There is a like recess 92 provided in the periphery of the annular housing 75 as a starting point for the knob 78 that is secured to the outside end of the spindle 74.

For the purpose of illustrating how a combination is set, and thereafter arrived at by turning either the knob 80 or the knob 78, a particular combination in the record book will be now worked out. The knob 80 is first removed from the spindle 74 and the two lugs 62 and 61 set opposite the number "1" on the top portion 53 of the sleeve 51. The sleeve 64 is then projected a sufficient distance through the sleeve 51 to bring its lower end properly within the hole 63 of the disk 16. The lugs 69 and 70 are then set opposite the numbers "1" and "8" respectively on the top portion 65 of the sleeve 64 after the latter has been turned to a position to bring its mark "0" over the number "1" on the top portion 53 of the sleeve 51. The collar 82 is then turned by the spindle 74 to bring its mark "0" over the number "1" on the top portion 65 of the sleeve 64. The lugs 86 and 87 are then set opposite the mark "0" on the collar, after which the washer 90 is applied and the knob 80 firmly secured to the inner end of the spindle.

Opposite the above combination in the record book, the following instructions appear for the operator to follow in turning either the knob 78 or the knob 80 to bring the recesses 19 in the disks 15, 16 and 17 into alinement. Starting at the smallest finger-tip recess 91 in the annular housing 54, the knob 80 is turned back or counterclockwise a distance of $6\frac{1}{2}$ recesses, which is determined by the feeling quality of the fingers alone, thereby making it impossible for another person to see or hear the combination. This first movement of the knob will bring the disk 15 to a position wherein its recess 19 will receive the pin 24. The knob is then rotated a distance of $3\frac{1}{4}$ recesses forward or clockwise to bring the middle disk 16 to a position wherein its recess 19 will register with the recess 19 in the disk 15. And when the knob is then turned a distance of $2\frac{1}{2}$ recesses back or counterclockwise, the spindle 74 will rotate the disk 17 to a position to bring its recess 19 into alinement with the recesses 19 in the other disks to permit the pin 24 to enter the alined recesses so that the knob 34 or the knob 35 may be turned to withdraw the locking element 9 from its locking position. The outside combination knob 78 may also be turned as above indicated to effect the same result.

Having described my invention, I claim:

1. A combination lock comprising a locking mechanism, a knob for operating said locking mechanism, means for setting said locking mechanism against operation until a set combination is secured by turning said knob, a stationary annular member containing finger-tip recesses in its periphery, in proximity with which the knob is adapted to be rotated to bring finger-tip recesses in its periphery into registry with the recesses in the stationary member, and means for silently arriving at the set combination by turning said knob, in each direction, to a point which the complete or partial registry of certain recesses indicates to the human fingers, is the limit of the movement of the knob in that direction for the set combination.

2. A combination lock comprising a casing, a locking element whose front end is movable into and out of said casing, a spring adapted to hold the front end of said element in locking position beyond said casing, a series of superimposed locking disks within said casing, each disk containing a peripheral recess adapted to be brought into alinement with each other, an engaging member adapted to enter the alined recesses of the disks when the front end of the locking element is forced inwardly beyond its locking position, link means connected between said engaging member and locking element, and slidable with said engaging member and locking element, which are substantially in parallelism, to prevent the inward movement of the locking element to an unlocking position when said engaging member is held out of said recesses by the periphery of one or more of said disks, and means for independently turning said disks to bring their recesses into alinement to receive said engaging member, whereby the locking element may be moved inwardly to an unlocking position.

3. A combination lock comprising a casing, a locking element whose front end is movable into and out of said casing, a spring adapted to hold the front end of said element in locking position beyond said casing, a series of superimposed locking disks within said casing, each disk containing a peripheral recess adapted to be brought into alinement with the recesses in the other disks, a longitudinally movable engaging member whose front end is adapted to enter said recesses when alined, a transverse link connecting said engaging member and locking element, and movable with them, a lug on said link, means for turning said disks to bring their recesses into alinement to receive the front end of the longitudinally movable engaging member, a knob, a spindle for said knob, and a dog secured to the knob spindle adapted to engage the lug on the slidable link, to draw the locking element inwardly against the tension of said spring when the disks are turned by the alining means to permit the engaging member to enter their registering recesses.

4. A combination lock comprising a casing, a locking element whose front end is movable into and out of said casing, a spring adapted to hold the front end of said element in locking position beyond said casing, a series of superimposed locking disks within said casing, each disk containing a peripheral recess adapted to be brought into alinement with the recesses in the other disks, a longitudinally movable engaging member, a guide secured to said casing for guiding the front end of said engaging member into said recesses when alined, a transverse link connecting said engaging member and locking element, and movable with them, a lug on the end of said link that is secured to the locking element, a partition in said casing against which one end of said spring presses, a knob spindle on the other side of said partition, and a dog on said knob spindle, the nose of said dog being between said partition and the lug on said link to limit the outward movement of said locking element, and to press against said lug, when the spindle is turned, to draw the locking element inwardly against the tension of said spring when the disks are turned to permit the engaging member to enter their registering recesses.

5. A combination lock comprising a casing, a locking element whose front end is movable into and out of said casing, an inwardly slidable member, means for restraining the inward movement of said member and capable of being turned to permit that movement, a lug projecting downwardly from the inner end of said locking element, into a longitudinal slot in the slidable member, an outside knob, a spindle therefor, a dog on said spindle, a lug on said slidable member adapted to be engaged by the dog to move inwardly the slidable member and the locking element when the outside knob is turned after the slidable member is free to be moved inwardly, an inside knob, and means operatively connected between the latter and the locking element to move it inwardly, independent of the slidable member, when the inside knob is turned, by virtue of the lug on the locking element moving through the slot in said slidable member.

6. A combination lock comprising a casing, a locking element whose front end is movable into and out of said casing, an inwardly slidable member below the locking element, means for restraining the inward movement of said member and capable of being turned to permit that movement, an engaging piece on top of said locking element, two lugs on the inner end of the latter, one of said lugs projecting downwardly into a longitudinal slot in the slidable member and the other projecting upwardly into a longitudinal slot in the movable piece, an outside knob, a spindle therefor, a dog on said spindle, a lug on said slidable member adapted to be engaged by the dog to move inwardly the slidable member and the locking element when the outside knob is turned after said slidable member is free to be moved inwardly, an inside knob, a spindle therefor, a dog on said spindle, and a lug on said movable piece adapted to be engaged by said dog to move the locking element inwardly, independent of the slidable member, when the inside knob is turned, by virtue of the downwardly projecting lug on the locking element moving through the slot in said slidable member.

7. A combination lock comprising a casing, a locking element whose front end is movable into and out of said casing, an inwardly slidable member below the locking element, means for restraining the inward movement of said member and capable of being turned to permit that movement, an engaging piece on top of said locking element, two lugs on the inner end of the latter, one of said lugs projecting downwardly into a longitudinal slot in the slidable member and the other projecting upwardly into a longitudinal slot in the movable piece, an outside knob, a spindle therefor, a dog on said spindle, a lug on said slidable member adapted to be engaged by the dog to move inwardly the slidable member and the locking element when the outside knob is turned after said slidable member is free to be moved inwardly, an inside knob, a spindle therefor, a dog on said spindle, a lug on said movable piece adapted to be engaged by said dog to move the locking element inwardly, independent of the slidable member, when the inside knob is turned, and a block member adapted to be moved between the wall of the casing and the inner ends of the slidable member, locking element and movable piece, to prevent the inward movement of any one of them for the purpose specified.

8. A combination lock comprising a casing, a locking element whose front end is movable into and out of said casing, a spring for holding said locking element in its outermost or locking position, a plurality of superimposed disks within said casing, each disk provided with a recess in its periphery, a longitudinally movable member connected with the locking element adapted to engage the peripheries of the disks to restrain the inward movement of the locking element until the disks are turned to bring their recesses into alinement to receive said member, a knob for moving the locking element inwardly when the longitudinally movable member is permitted to enter the recesses in said disks, an element fitted into the inner disk for turning it, sleeves surrounding said element and fitted into the other disks for turning them, a projecting piece on the inner sleeve, a projecting piece on the outer sleeve adapted to be engaged by the projecting piece on the inner sleeve to be turned by the latter, a knob on said turning element, and an engaging piece on the latter adapted to strike and turn the projecting piece on the inner sleeve, and through it to turn the outer sleeve when the second knob is turned, for rotating, in conjunction with the turning element, the disks to positions wherein their recesses will be in alinement to receive the longitudinally movable member when the first knob is turned.

9. A combination lock comprising a casing, a locking element whose front end is movable into and out of said casing, a spring for holding said locking element in its outermost or locking position, a plurality of superimposed disks within said casing, each disk provided with a recess in its periphery, a longitudinally movable member connected with the locking element, adapted to engage the peripheries of the disks to restrain the inward movement of the locking element until the disks are turned to bring their recesses into alinement to receive said member, a knob for moving the locking element inwardly when the longitudinally movable member is permitted to enter the recesses in said disks, a spindle adapted to turn the inner disk, passing loosely through holes in the second and third disks, a knob on said spindle, a sleeve surrounding said spindle, fitted into the second disk, a second sleeve surrounding the first sleeve, fitted into the third disk, a removable ring secured to the top portion of the first sleeve, a removable ring secured to the top portion of the second sleeve, an upturned lug on the first ring, an upturned lug on the second ring, adapted to engage the lug on the ring of the first sleeve, to turn it, a collar fitted on said spindle above the ring on the second sleeve, a removable ring secured to the top portion of said collar, and a lug on the ring on said collar, adapted to engage the lug on the ring on the second sleeve, and through the latter, to turn the first sleeve, whereby, said rings when they have been rotated by the spindle knob in accordance with a set combination, will turn the sleeves which, in conjunction with the spindle, will rotate the disks to positions wherein their recesses will be in alinement to receive the longitudinally movable member for the purpose specified.

10. A combination lock comprising a casing, a locking element whose front end is movable into and out of said casing, a spring for holding said locking element in its outermost or locking position, a plurality of superimposed disks within said casing, each disk provided with a recess in its periphery, a longitudinally movable member connected with the locking element, adapted to engage the peripheries of the disks to restrain the inward movement of the locking element until the disks are turned to bring their recesses into alinement to receive said member, a knob for moving the locking element inwardly when the longitudinally movable member is permitted to enter the alined recesses in said disks, a spindle fitted into the lower disk to turn it, and passing loosely through holes in the second and third disks, a knob on said spindle, a sleeve surrounding said spindle, fitted into the second disk, a second sleeve surrounding the first one, fitted into the third disk, a flanged top for each sleeve, sector-shaped teeth formed on each top around the central hole in its respective sleeve, numbers on each top circumferentially disposed between its circular edge and said teeth, a ring adapted to rest upon the flanged top of each sleeve, radial projections on each ring adapted to be fitted between the teeth to hold the ring in a set position, a lug on the ring of the first sleeve, adapted to be set opposite a certain number on the top of said sleeve, a lug on the ring of the second sleeve adapted to be set opposite a certain number on the top portion of said second sleeve and adapted to engage the lug on the ring of the first sleeve to turn the latter, a collar on the spindle above the second ring, sector-shaped teeth formed on the top portion of said collar around its central hole, numbers on the top of said collar circumferentially disposed between its circular edge and said teeth, a ring adapted to rest upon the top of said collar, radial projections on said third ring adapted to be fitted between the teeth on said collar, to hold said ring in a set position, and a lug on the last named ring adapted to engage the lug on the ring of the second sleeve, and through the latter, to turn the first sleeve, whereby, said rings when they have been turned by the spindle knob in accordance with a set combination, will turn the sleeves which, in conjunction with the spindle, will rotate the disks to positions wherein their respective recesses will be in alinement to receive the longitudinally movable member for the purpose specified.

In testimony whereof I have hereunto set my hand this 27th day of March, 1920.

MATTHIAS F. KUNTZ.

Witness:
HOWARD S. SMITH.